United States Patent
Zukowski

(10) Patent No.: US 10,390,579 B2
(45) Date of Patent: Aug. 27, 2019

(54) HELMET WITH AUTOMATIC EMERGENCY PROCESSING

(71) Applicant: Harman Becker Automotive Systems GmbH, Karlsbad (DE)

(72) Inventor: Paul Zukowski, Chamerau (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 16/075,565

(22) PCT Filed: Feb. 11, 2016

(86) PCT No.: PCT/EP2016/052913
§ 371 (c)(1),
(2) Date: Aug. 3, 2018

(87) PCT Pub. No.: WO2017/137083
PCT Pub. Date: Aug. 17, 2017

(65) Prior Publication Data
US 2019/0045867 A1    Feb. 14, 2019

(51) Int. Cl.
*A42B 3/00*     (2006.01)
*A42B 3/04*     (2006.01)
*H04W 4/90*     (2018.01)
*A42B 3/30*     (2006.01)
*H04B 1/3827*   (2015.01)

(52) U.S. Cl.
CPC ........... *A42B 3/046* (2013.01); *A42B 3/30* (2013.01); *H04B 1/385* (2013.01); *H04W 4/90* (2018.02); *H04B 2001/3866* (2013.01)

(58) Field of Classification Search
CPC ......... A42B 3/046; H04W 4/90; H04B 1/385; H04B 2001/3866
See application file for complete search history.

(56) References Cited

U.S. PATENT DOCUMENTS

| | | | |
|---|---|---|---|
| 9,861,151 B2 * | 1/2018 | Ciaramelletti | ......... A42B 3/046 |
| 2003/0071766 A1 | 4/2003 | Hartwell et al. | |
| 2008/0240465 A1 * | 10/2008 | Shiraishi | ................ H04B 1/385 381/94.7 |

(Continued)

FOREIGN PATENT DOCUMENTS

WO    2011018168 A1    2/2011

OTHER PUBLICATIONS

ISA European Patent Office, International Search Report and Written Opinion Issued in Application No. PCT/EP2016/052913, dated Oct. 18, 2016, WIPO, 9 pages.

*Primary Examiner* — Khai M Nguyen
(74) *Attorney, Agent, or Firm* — McCoy Russell LLP

(57) ABSTRACT

Emergency call processing in a helmet (100) with a rigid shell (101) that spatially divides a shell interior from a shell ambiance includes receiving an emergency indication signal, upon reception of the emergency indication signal establishing a speech link between a controllable transceiver and a counterpart transceiver via at least one wireless communication channel, and reproducing sound in the shell interior and picking up sound with a sensitivity that is higher in the shell interior than in the shell ambience. The sound reproduced in the shell is received from the counterpart transceiver and the sound picked-up in the shell interior is transmitted to the counterpart transceiver.

18 Claims, 5 Drawing Sheets

(56) References Cited

U.S. PATENT DOCUMENTS

| | | |
|---|---|---|
| 2008/0256687 A1 | 10/2008 | Spencer |
| 2015/0305426 A1* | 10/2015 | Lee ........................ A42B 3/046 |
| | | 340/539.12 |
| 2016/0355126 A1* | 12/2016 | Anderson .......... H04N 5/23203 |
| 2018/0287648 A1* | 10/2018 | Auerbach ................ A42B 3/30 |

* cited by examiner

HELMET WITH AUTOMATIC EMERGENCY PROCESSING

CROSS REFERENCE TO RELATED APPLICATIONS

The present application is a U.S. National Phase of International Patent Application Serial No. PCT/EP2016/052913, entitled "HELMET WITH AUTOMATIC EMERGENCY PROCESSING," filed on Feb. 11, 2016. The entire contents of the above-identified application are hereby incorporated by reference for all purposes.

BACKGROUND

1. Technical Field

The disclosure relates to a system and method (generally referred to as a "system") for emergency processing in a helmet.

2. Related Art

Automated emergency event notification telematics systems can effectively and expeditiously directly notify emergency response operators in an emergency call center of a transport emergency event. The emergency response operators may then dispatch emergency personnel, such as an emergency medical service team, to the site of the transport emergency event. Common automated emergency event notification telematics systems for cars are for example the eCall system in Europe and the 911 system in the United States. Although motorcyclists are more likely to be involved in accidents than cars, motorcyclists benefit from the common automated emergency event notification telematics systems only in a modest way since in most motorcycle accidents the motorcyclist is thrown away from the motorcycle and is thus separated from it. Therefore, there is a need for an automated emergency event notification telematics system applicable in connection with motorcycles.

SUMMARY

A helmet includes a rigid shell configured to spatially divide a shell interior from a shell ambiance and an acoustic front-end including at least one loudspeaker disposed in the shell interior and at least one interior microphone having a sensitivity that is higher in the shell interior than in the shell ambience. The helmet further comprises a controllable transceiver operatively coupled to the acoustic front-end, the transceiver configured to establish a speech link with a counterpart transceiver via at least one wireless communication channel, and a controller configured to receive an emergency indication signal and to control the transceiver to automatically establish via the at least one wireless communication channel a speech link between the acoustic front-end and the counterpart transceiver when the emergency indication signal is received.

An emergency call method for a helmet with a rigid shell is configured to spatially divide a shell interior from a shell ambiance. The method includes receiving an emergency indication signal, upon reception of the emergency indication signal establishing a speech link between a controllable transceiver and a counterpart transceiver via at least one wireless communication channel, and reproducing sound in the shell interior and picking up sound with a sensitivity that is higher in the shell interior than in the shell ambience. The sound reproduced in the shell is received from the counterpart transceiver and the sound picked-up in the shell interior is transmitted to the counterpart transceiver.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

In the following description, all examples shown are related to a motorcyclist riding a motorcycle but are applicable to all other drivers wearing a helmet and driving any type of land, water or air vehicles.

A helmet may comprise several layers, including a shell, a shock-absorbing layer, and a comfort layer. A helmet's shell is the outermost layer and is typically made from resilient, water-resistant materials such as plastic and fiber composites. The shell spatially divides (to some extent) a shell interior from a shell ambiance. A helmet's shock-absorbing layer, which is its primary safety layer, may be made out of a rigid, but shock-absorbing material such as expandable polystyrene foam. Although not typical, a helmet's fire-proof layer may be integrated and made of a closed-cell material such as vinyl-nitrile, which is both fire and water resistant. Further, this layer may have sound and thermo-insulating qualities and may be alternatively referred to as an acoustic layer. Finally, a helmet's comfort layer may be made of a soft material meant to contact with a motorcyclist's skin, such as cotton or other fabric blends as are known in the art. Other layers may be present as well, and some of the aforementioned layers may be omitted or combined.

Helmets may include ear-cups, which may be molded into the rigid portions of the helmet, such as the foam layer. The ear-cups may be static and merely provide space for a motorcyclist's ears and/or loudspeakers, so that a motorcyclist may listen to music or communicate over an electronic communication system. In some cases, the ear-cups may be mounted to the shell of the helmet so that they can provide better comfort to motorcyclists. Standard ear-cups may be formed from a rigid material that is vibrationally coupled to the helmet's shell, or the ear-cup is directly connected to the helmet's shell.

Figure 1:
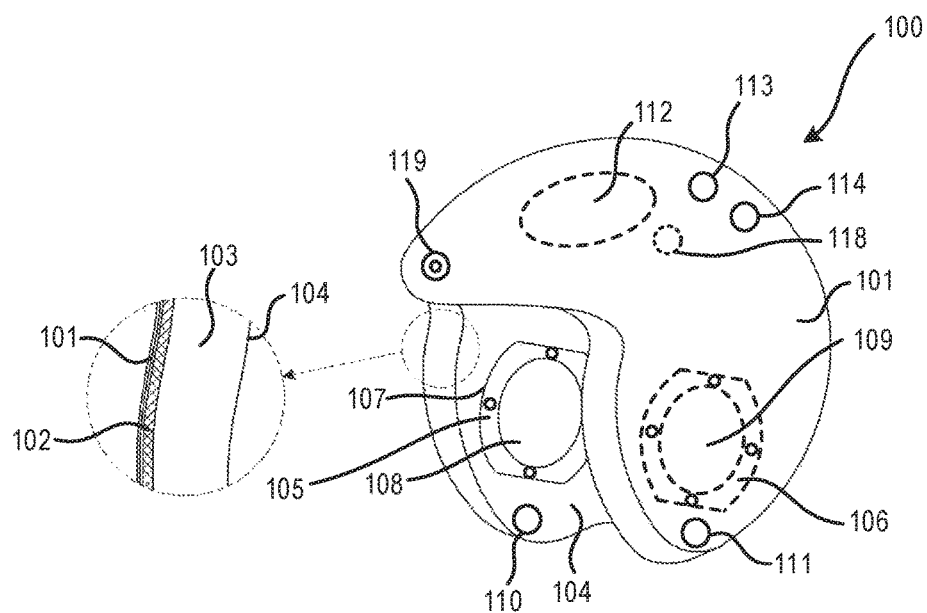
FIG. 1 is a perspective view of a motorcycle helmet with an exemplary emergency processing module.

FIG. 1 is a perspective view of a motorcycle helmet 100. The helmet 100 comprises an outer shell 101, an acoustic layer 102, a foam layer 103, and a comfort layer 104. The helmet 100 further comprises ear-cups 105 and 106 which are mounted on each inner side of the helmet 100 where the ears of a user will be when the helmet 100 is worn by the user. Note that in FIG. 1 only one ear-cup 105 is visible. However, an identical ear-cup 106, shown in broken lines, is present on the opposite side of the helmet 100. The ear-cup 105 is (and so is ear-cup 106) acoustically isolated from the shell 101 of the helmet 100 by an isolation mount 107. The isolation mount 107 may be made of a vibration dampening material. The vibration dampening material may prevent shell vibrations from reaching a user's ear and thus may decrease the user's perception of those vibrations as noise. Thus, by mounting the ear-cup 105 to something other than the shell 101 of the helmet, and decoupling it from rigid materials that easily transmit vibrations, noise transmitted to the ear-cup 105 may be passively reduced.

Each ear-cup 105, 106 may partly embrace, for example, a loudspeaker 108, 109 or other type of sound driver or electro-acoustic transducer or a group of loudspeakers, built into the ear-cup 105, 106. Alternatively the loudspeakers 108 and 109 may be disposed in and attached to the shell interior in any other appropriate way. Additionally, the helmet 100 may include one or more acoustic sensors such as microphones 110 and 111 which may be attached to and acoustically decoupled from the shell 101 in such a manner that they pick up sound in the shell interior (microphone 110), e.g., speech from a person wearing the helmet, and sound in shell ambience (microphone 111), e.g., from a person in the vicinity of the helmet such as pedestrians, emergency personnel, etc. The microphones 110 and 111 in conjunction with loudspeakers 108 and 109 form part of an acoustic front for an emergency processing module 112.

The emergency processing module 112 may be partly or completely mounted within the shell 101 (i.e., in the shell interior) and may be vibrationally isolated from the shell 101 by vibration dampening material. Alternatively, emergency processing module 112 is completely disposed outside the helmet 100 and the loudspeakers 108, 109 and the microphone arrays 110 and 111 are linked via a wired or wireless connection to the emergency processing module 112. Furthermore, the emergency processing module 112—regardless of where it is disposed—may be linked via a wired or wireless connection to an audio signal bus system and/or a data bus system (both not shown in FIG. 1). The emergency processing module 112 may be further connected to at least one sensor such as an acceleration sensor (array) 113 and an inclination sensor (array) 114 which are attached to (the inner or outer side of) the shell 101. Additionally or alternatively any other appropriate sensor (not shown) such as a temperature sensor may be employed. A helmet occupancy sensor 118 may be disposed at an inner surface of the shell 101, which evaluates whether the helmet 100 is worn by an individual or not. An emergency button 119 may be disposed on the outer surface of the shell 101 above the forehead of a person wearing the helmet 100.

Optionally, at least one additional loudspeaker (not shown) that radiates sound to the ambience of the helmet 100 and that allows for persons in the vicinity of the helmet 100 to better hear speech messages that are received by the emergency processing module 112 and that are otherwise radiated by the loudspeakers 108 and 109 in the helmet interior may be integrated in or attached to the helmet 100. The at least one additional loudspeaker and/or microphone 111 may be disposed in the vicinity of the emergency button 119. Furthermore, at least one of the at least one additional loudspeaker, microphone 111 and emergency button 119 may be disposed under and, thus, covered by a slider, flap or hatch. In another example, the emergency button 119 may be triggered when sliding, detaching or flipping the slider, flap or hatch. A combination of additional loudspeaker and microphone in a position above the forehead of a person wearing the helmet 100 would make it easier for persons in the vicinity of the helmet 100, such as emergency personnel, to identify the direction in which they should talk.

Instead of a single microphone 111, an array of a multiplicity of microphones, e.g., disposed on the outer surface of the shell 101 above the forehead of a person wearing the helmet 100, may be employed, e.g., in connection with a beamforming module. Beamforming (also known as spatial filtering) is a signal processing technique used in microphone arrays for directional sound reception. This is achieved by combining elements in a phased array in such a way that signals at particular angles experience constructive interference while others experience destructive interference. Beamforming can be used at both the transmitting (loudspeaker) and receiving (microphone) ends in order to achieve spatial selectivity.

Furthermore, at least one of the microphone 110 and microphone 111 may be used in connection with echo cancellation. Echo cancellation (also known as echo suppression) is a method in telephony to improve voice quality by preventing echo from being created or removing it after it is already present. In addition to improving subjective quality, this process increases the effect achieved by silence suppression by preventing echo from traveling across a network. There are various types and causes of echo with unique characteristics, including acoustic echo (sounds from a loudspeaker being reflected and recorded by a microphone, which can vary substantially over time) and line echo (electrical impulses caused by, e.g., coupling between the sending and receiving wires, impedance mismatches, electrical reflections, etc.), which varies much less than acoustic echo. In practice, however, the same techniques are used to treat all types of echo, so an acoustic echo canceller can cancel line echo as well as acoustic echo. Acoustic echo cancellation is commonly used to refer to echo cancelers in general, regardless of whether they are intended for acoustic echo, line echo, or both.

Figure 2:
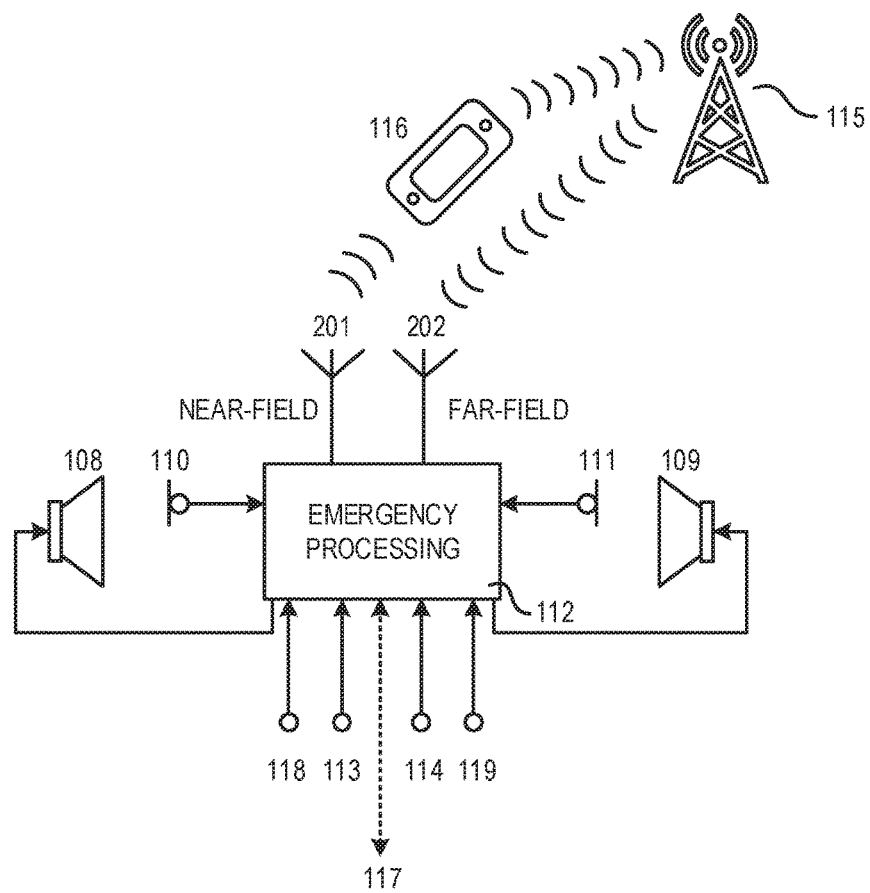
FIG. 2 is a signal flow diagram of the helmet with an exemplary emergency processing module as shown in FIG. 1.

FIG. 2 is a signal flow chart of the system described above in connection with the helmet 100 shown in FIG. 1. Microphones 110 and 111 provide to the emergency processing module 112 electrical signals that represent the sound picked up by the microphones 110 and 111 at their respective positions and their directivity pattern. Acceleration sensor 113 and inclination sensor 114 provide to the emergency processing module 112 electrical signals that represent the accelerations that affect the helmet 100 and the upright position of the helmet 100. The emergency processing module 112 processes the signals from microphones 110, 111 and sensors 113, 114, and drives the loudspeakers 108 and 109. The emergency processing module 112 further transmits and receives data and/or audio signals via a (mainly) wireless near-field communication interface 201 and/or a (mainly) wireless far-field communication interface 202.

For example, audio signals transmitted via near-field communication interface 201 and/or far-field communication interface 202 may be used, e.g., for (bidirectional) speech communication between a distant emergency call center and the wearer of the helmet (employing microphone 110) or rescue personnel in the vicinity of the helmet 100 (employing microphone 111). Far-field communication (e.g., GSM, LTE, UMTS, 3G etc.) may take place directly between the far-field communication interface 202 and distant radio station 115 to which the emergency call center is connected. Near-field communication (e.g., Bluetooth, WiFi, WLAN etc.) may take place between the near-field communication interface 201 and a smartphone 116 that is equipped with a near-field communication interface and a far-field communication interface. The far-field communication interface of the smartphone 116 may further communicate with the distant radio station 115 so that a communication chain is established between the helmet 100 and the distant radio station 115.

However, the communication between the helmet 100 and the distant radio station 115 may not or not only be a speech communication but may alternatively or additionally include a unidirectional or bidirectional data communication. For example, in the case of a detected emergency state, global positioning data, inclination data, crash data, temperature data, and last maximum speed data before detecting an emergency may be transferred to the emergency call center. The emergency processing module 112 may be further connected to a bus 117 that is, for example, a vehicle bus or connected to a vehicle bus. Via the bus 117, data related to the vehicle (e.g., a motorcycle) may be transferred to the emergency processing module 112 such as data from a crash sensor, an acceleration sensor, a speed sensor, a temperature sensor, an inclination sensor, a global positioning sensor etc. disposed in the vehicle (not shown).

Figure 3:
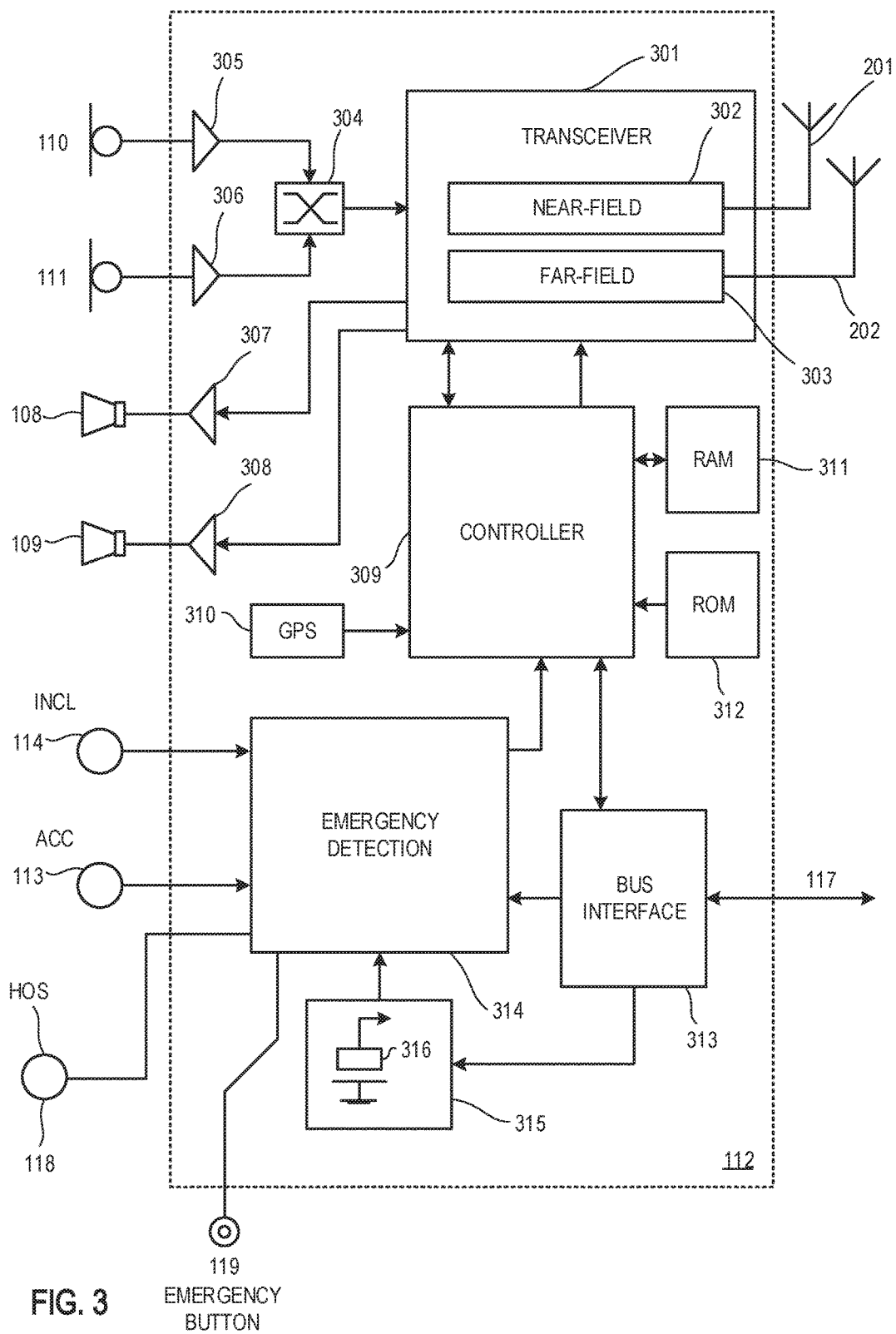
FIG. 3 is a signal flow diagram of an exemplary emergency processing module applicable in the helmet shown in FIG. 2.

FIG. 3 is a signal flow diagram of the emergency processing module 112 used in the helmet 100 shown in FIGS. 1 and 2. The emergency processing module 112 includes a transceiver module 301 which includes a near-field transceiver 302 and far-field transceiver 303 which form together with two respective antennas the near-field communication interface 201 and the far-field communication interface 202. The transceiver module 301 is supplied with an output signal of a microphone signal mixer 304 which combines output signals of microphones 110 and 111. The output signals of microphones 110 and 111 may be amplified by way of input amplifiers 305 and 306. The microphone mixer 304 may be, for example, a simple adder that adds the output signals of microphones 110 and 111, or may be a soft switch that switches with a smooth slope between the two microphone signals. However, any type of mixer that adds the two microphone signals upon controlled weighting of each of them is possible.

The combiner 304 may be controlled, for example, dependent on information from a helmet occupancy detector that detects whether the helmet is worn by a person or from a voice activity detector that detects whether someone wearing the helmet or someone in the vicinity of the helmet is momentarily speaking. The transceiver of 301 further provides signals to the loudspeakers 108 and 109 via respective output amplifiers 307 and 308. The transceiver of 301 is similar to transceivers used in cellular phones and, thus, is adapted not only for the transmission of audio signals but also for the transmission of data signals in general such as short message service (SMS), email and internet protocol.

Data to be transferred via the near field communication interface 201 and/or the far field communication interface 202 by the transceiver 301 are provided by a controller 309 which also controls the transceiver 301. The controller 309 may receive data from a global positioning system (GPS) module 310, a random access memory (RAM) 311, a read only memory (ROM) 312, a bus interface 313, and an emergency detection module 314. For example, the GPS module 310 may be integrated in the emergency processing module 112 and may provide data regarding the momentary position of the helmet. The RAM 311 may store or buffer fluctuating data such as vehicle speed or other data that change over time. The ROM 312 may store permanent data such as, for example, the name, address and age of the helmet wearer, blood group, specific health risks etc. if the bus interface 313 is connected to the bus 117 and serves as a further data source.

Additional data or data that cannot be generated by the helmet may be transmitted from the vehicle (e.g., motorcycle) to the bus interface 313, from where they are distributed to the controller 309 and/or an emergency detection module 314. The bus interface may be bidirectional so that data can also be sent from the controller 309 to the vehicle. As mentioned before, such data may include data from sensors disposed in the vehicle such as crash sensors, acceleration sensors, speed sensors, temperature sensors, inclination sensors, global positioning sensors and other sources of information of interest in connection with an emergency case. The bus 117, when wired, may also provide electrical energy to a voltage supply module 315 which supplies a supply voltage V to the emergency processing module 112. The voltage supply module 315 may include a rechargeable battery in order to maintain operation of the emergency processing module 112 if bus 117 is interrupted, e.g., in case of a crash. Alternatively, the bus 117 is wireless and the battery 316 serves as the only energy source for the emergency processing module 112. In the example shown in FIG. 3, the emergency detection module 314 is connected to the acceleration sensor 113 and the inclination sensor 114. As already mentioned, the emergency detection module 314 may also receive additional data that are relevant in connection with evaluating an emergency case from the bus interface 313 and, thus, from the vehicle. Such data may include data related to the helmet occupancy as detected by helmet occupancy detector 118. The emergency detection module 314 monitors the different data and evaluates these data in view of data constellations typical for an emergency situation.

The helmet described above in connection with FIGS. 1 to 3 provides emergency telematics services to automatically qualify crash events before directly placing a standard 3-digit emergency call to a local emergency response operator. A qualification of the emergency event may be performed in two stages. The first stage produces a qualified crash detection decision wherein a preliminary crash detection based on impact sensors is qualified by non-impact sensors in addition to vehicle telemetry data that is available, for example, from a GPS sensor disposed in the helmet or in the motorcycle. The second stage uses an emergency severity evaluation algorithm to score the detected crash for the purpose of deciding if the crash warrants an emergency call to the emergency response operator. In the following description, the "emergency calls" may refer to the US "911" emergency calls or the European Union eCall "112" emergency calls, as the case may be.

Figure 4:
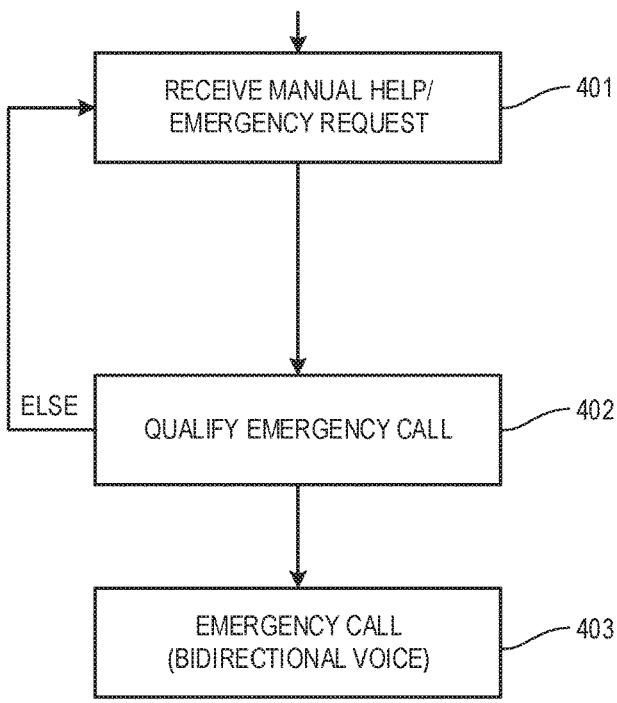
FIG. 4 is a process flow diagram of an emergency processing module which places a direct emergency call in response to a manual help/emergency request.
Figure 5:
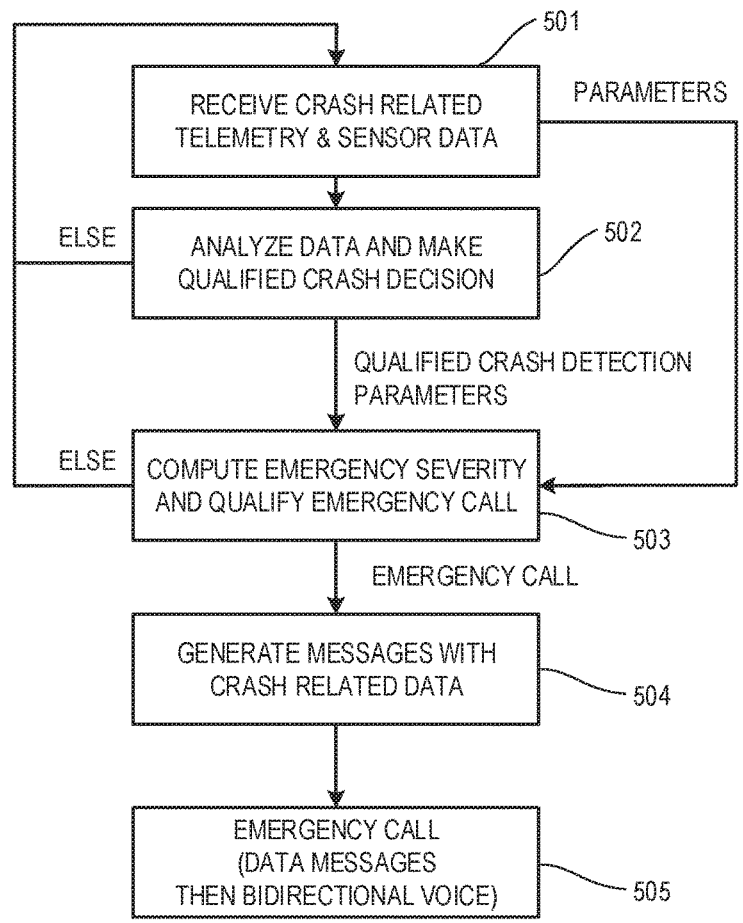
FIG. 5 is a process flow diagram of an emergency processing module which places a direct emergency call in response to an automatic detection of a crash.

FIGS. 4 and 5 illustrate process flows of example processes performed in an emergency processing module such as emergency processing module 112 to place a direct emergency call in response to either a manual help/emergency request or a motorcycle crash emergency event. If a manual help/emergency request is received by a procedure 401, the request is qualified by a procedure 402. For example, procedure 402 may require a repeat of the manual help/emergency request to confirm the initial request before an emergency call is placed. If the request is confirmed, the built-in transceiver 301 directly calls 112 (EU) or 911 (US) in a procedure 403 and initiates a bidirectional voice call between the wearer of the helmet 100 and an emergency response operator at an emergency dispatch center. This obvious 'repeat request' form of qualification of the manual help/emergency event in a direct-call system is considered a satisfactory means of reducing false alarm calls to the emergency response operator. Processing for a vehicle crash emergency event as depicted in FIG. 5 is more advanced than manual help/emergency processing as depicted in FIG. 5, in large part because detecting the vehicle crash event itself involves sensors and signal processing algorithms that can provide false alarms. In contrast, the manual help/emergency event results from a person pushing a button (e.g., emergency button 119 in FIGS. 1 to 3).

Referring to the vehicle crash event processing as depicted in FIG. 5, procedure 501 receives crash related data. For example, procedure 501 may receive the helmet's internal crash sensor data and may, in addition, receive externally generated crash related vehicle telemetry data that is made available to the emergency processing module 112 by the motorcycle and/or other sources. These combined data are analyzed by procedure 502, make a preliminary crash detection decision that may be based on data from impact sensors and make a qualified crash detection decision that may be based on validating data from non-impact sensors and crash related telemetry data. If there is no qualified crash detection, process control returns to procedure 501. For qualified crash detections, a procedure 503 computes an emergency severity analysis based on the relevant crash analysis parameters and qualifies a decision to place an emergency call (or not) as described below.

If the decision from procedure 503 is to place an emergency call, then this decision results in the activation of a procedure 504 which generates one or more data messages that contain crash related data that are of interest to the emergency response operator. These crash related data may include, for example, the change in velocity, direction of impact, acceleration that acted on the helmet, whether there were multiple impacts, the vehicle type and, in addition, an emergency severity analysis that is based on these data. The data messages generated by procedure 504 are then input to a procedure 505 which initiates the emergency call, sends the data messages to the emergency response operator and establishes a bidirectional voice call between the emergency response operator and the wearer of the helmet or a person in the vicinity of the helmet.

Note that regarding procedure 501, the type of crash related vehicle telemetry data that is made available by the motorcycle to the emergency processing module 112 may include the vehicle identification number and the speedometer data. Receiving crash related sensor data (procedure 501) and processing this data to make a qualified crash detection decision (procedure 502) may use distributed impact sensing systems to reduce the probability of placing a false alarm call to the emergency response operator. For example, crash detection systems may use multiple pressure sensors in the peripheral crush zones of the motorcycle in addition to a multi-axis accelerometer (e.g., 2-axis, 3-axis up to 9-axis including rotational axes) in a non-crush zone associated with the motorcyclist's seat. For example, a detected rotation by an acceleration sensor may indicate an emergency situation. Furthermore, in order to reduce the probability of placing a false alarm call, a qualified crash detection decision may take advantage of three (or even more) crash related data source types such as impact sensors, non-impact sensors and vehicle telemetry data. Requiring time correlated detection indications from multiple independent crash detection sources provides a way of reducing the probability of system failure defined as either failing to recognize a true crash or falsely reporting a crash.

Identifying a crash may include receiving and processing accelerometer data alone or in combination with and at least one crash related parameter to determine that a motorcycle may have experienced a crash. The at least one crash related parameter may be identified as being associated with the motorcycle's status before and/or after the identified crash, which is used to calculate a probability of serious injury to persons associated with the crash. Thereafter, an emergency services call may be initiated if the calculated probability exceeds a predetermined probability threshold. A communication signal may be transmitted to the motorcycle inquiring as to whether any persons associated with the crash have been injured, and a person associated with the crash may then speak, sound the horn, shout, or make a noise another way (i.e., by banging), etc. The system may then receive a voice sample from at least one person associated with the crash responsive to the transmitted communication signal in one example. Assuming voice is received, the voice sample may be processed to identify a level of distress being experienced by the responding at least one person and initiate a call to emergency services if the level of distress is above a qualifying distress level threshold and if the calculated probability of serious injury is above a qualifying serious injury threshold.

Figure 6:
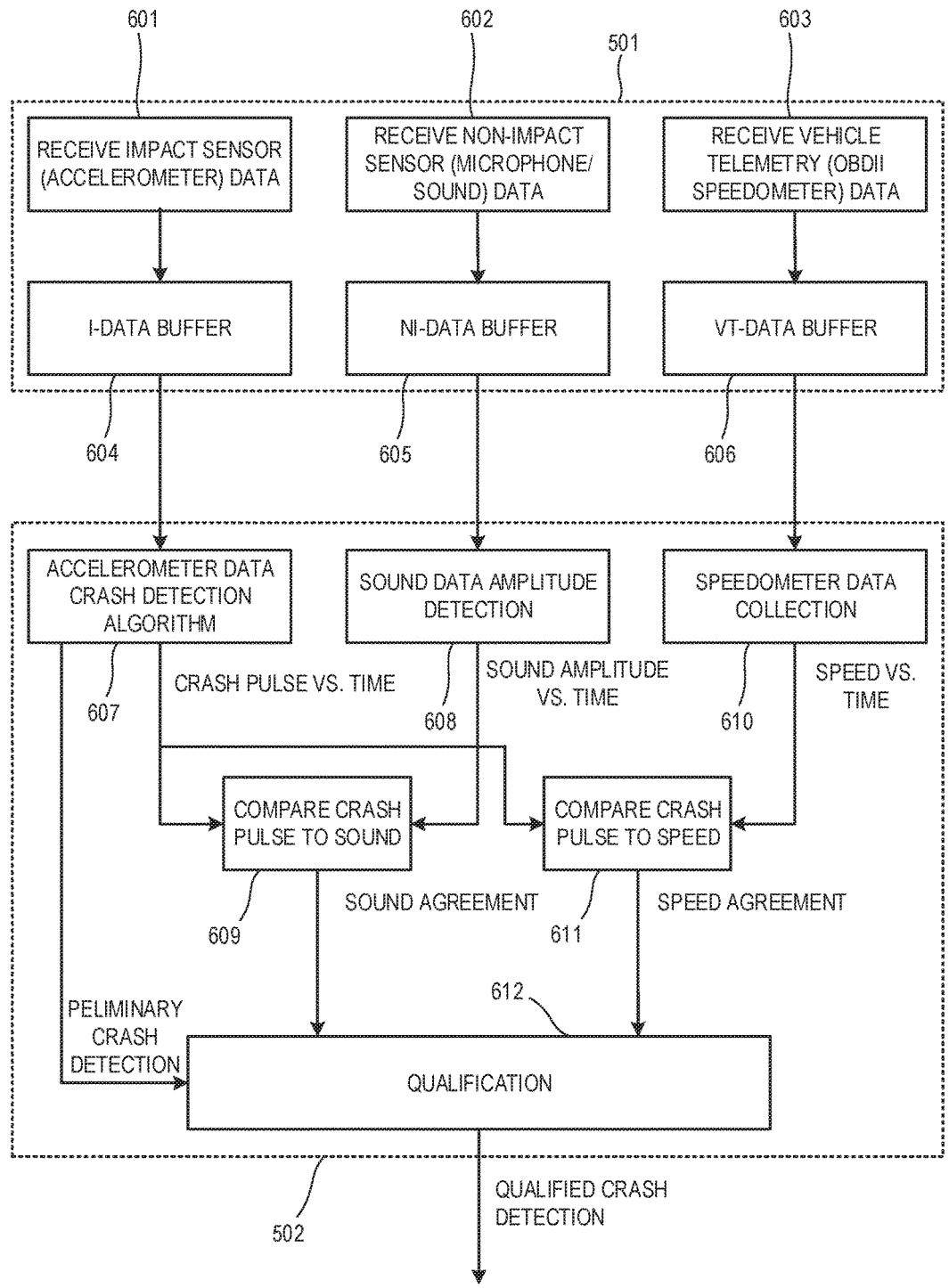
FIG. 6 is a process flow diagram of an emergency processing module in which impact and non-impact sensor data and vehicle telemetry data is input and processed to form both a preliminary and a qualified automatic crash detection.

FIG. 6 shows an example for procedures 501 and 502 in which impact and non-impact sensor data and vehicle telemetry data is input (procedure 501) and processed (procedure 502) to form both a preliminary and a qualified automatic crash detection. In this example, the impact sensor (for a receiving procedure 601) may be an electronic 2-axis or 3-axis accelerometer sensor, the non-impact sensor (for a receiving procedure 602) may be a microphone and the vehicle telemetry data (for a receiving procedure 603) may be speedometer data obtained from the motorcycle (e.g., via bus 117). The impact sensor data are input into an I-data buffer 604, non-impact sensor data are input into an NI-data buffer 605, and the vehicle telemetry data are input into a VT-data buffer 606. Other helmets may have different or additional impact sensors inputting data to the I-data buffer 605, different or additional non-impact sensors inputting data to the NI-data buffer 605, and different or additional vehicle telemetry data inputting to the VT-data buffer 606.

The example shown in FIG. 6 illustrates operations of forming a preliminary crash detection based on data from impact sensors and then qualifying the detection based on an agreement of the impact sensor data with the crash related non-impact sensors data and the vehicle telemetry data. The required agreement may be established by observing the time correlation between the impact, non-impact and vehicle telemetry data and comparing the observations to those expected for 'true' crash detections.

For example, in a procedure 607 a crash detection algorithm processes the accelerometer data to make a preliminary crash detection decision and to determine the time of the associated accelerometer crash pulse. For example, if filtered acceleration data in the motorcycle's forward direction and the vehicle's right-side direction is used, the resultant acceleration amplitude data may be computed using the square root of the sum of the squares. A preliminary crash is detected whenever the resultant acceleration amplitude data exceeds a preset detection threshold. Otherwise no preliminary crash detection output is generated.

A procedure 608 processes sound data from the microphone to determine a total sound amplitude measurement. The sound amplitude versus time data and the crash pulse versus time data are compared in a procedure 609. This operation may, for example, generate a sound agreement output if there is an increase in the sound data as expected when the resultant acceleration amplitude data are higher than the threshold, thereby defining a crash pulse actually associated with a vehicle crash. A procedure 610 gathers speedometer data from the motorcycle to provide motorcycle speed versus time data. The speed versus time data and the crash pulse versus time data are compared in a procedure 611. This operation may, for example, generate a speed agreement output if there is a sudden change in the vehicle speed, as expected if the resultant acceleration amplitude data are higher than the threshold, thereby defining a crash pulse actually associated with a vehicle crash. Alternatively, the motorcycle speed input to procedure 610 is obtained from the GPS sensor (which is a non-impact sensor).

A qualification procedure 612 combines the processing of results of the impact sensor based crash detection algorithm of procedure 607 and the agreement of results from procedures 609 and 611, which compare the crash pulse data to the sound amplitude data and the speedometer data, respectively.

Figure 7:
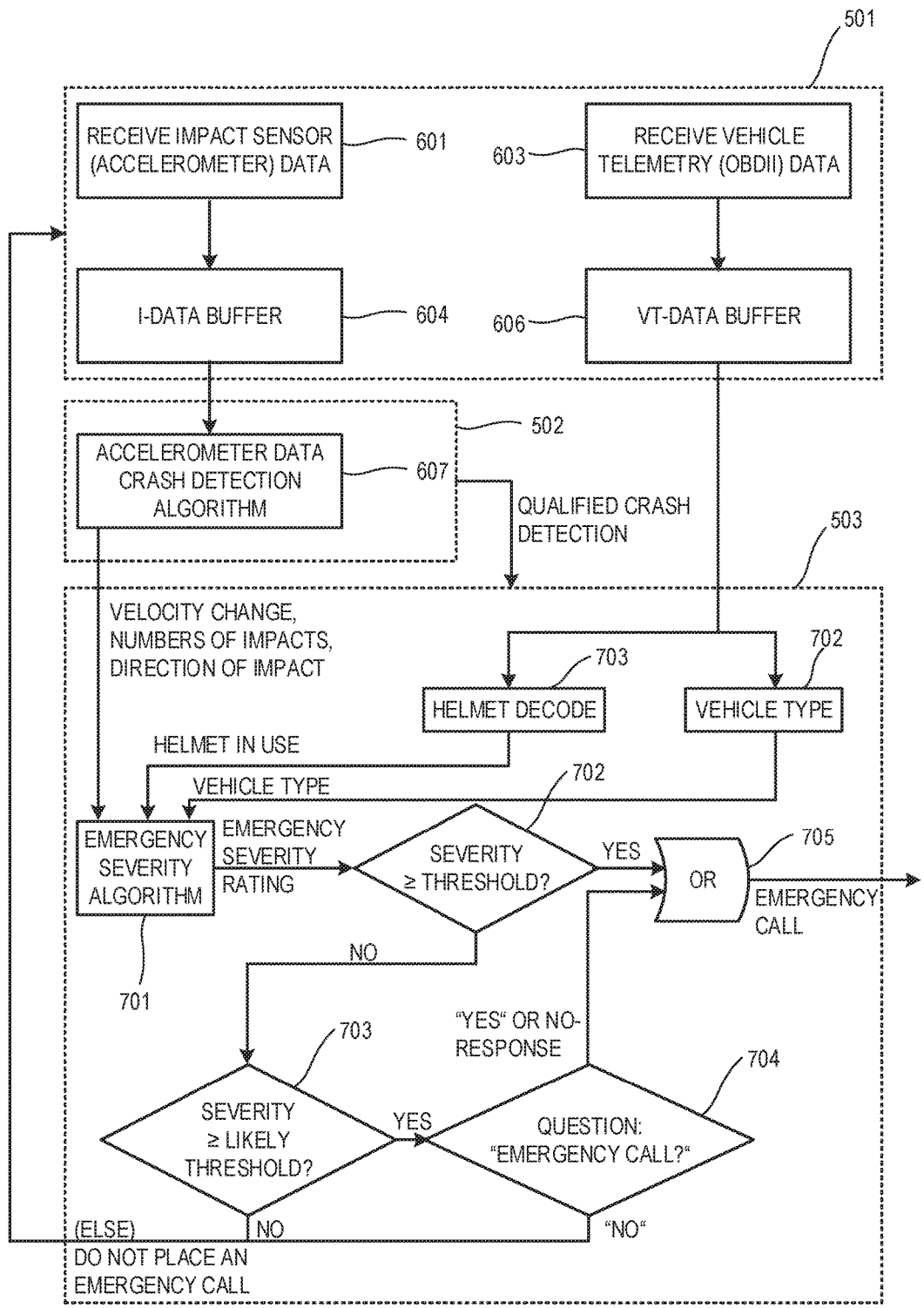
FIG. 7 is a process flow diagram of an emergency processing module for automatically making the decision to make an emergency call or not.

FIG. 7 shows an example for automatically making the decision to place an emergency call or not. The decision is made in procedure 503 based in part on the output of an emergency severity analysis algorithm of a procedure 701. The emergency severity analysis algorithm may, for example, use at least one given definition of an emergency and the inputs that are available to a second stage, i.e., operation 503, when it is activated by the reception of a qualified crash detection output from a first stage, i.e., procedure 502.

The motorcycle type information is available from decoding, in operation 702, data from the VT-data buffer from operation 606 to identify different types of motorcycles, e.g., by the number of wheels, motor power, etc. For example, the decoding may take place with the aid of installation/initialization procedures that include, for example, a one-time communications with an internet server.

The helmet occupation data are available from sensor 118. For example, obtaining the helmet occupation data of interest can also be part of the installation/initialization procedure. If the helmet is not worn by a user, as indicated by the helmet occupation data, procedure 703 may then interpret the helmet occupation data so that it is assumed that any other information characterizing an emergency is invalid. For example, when the helmet is dropped and crashes onto the floor some signals may indicate a crash. However, as the helmet is not worn, these signals are not interpreted as crash signals by a subsequent emergency severity analysis algorithm included in procedure 701.

The accelerometer/impact sensor based crash detection algorithm in procedure 607 may readily provide crash data regarding the velocity change, direction of impact, and the number of impacts. As is known, the velocity change may be obtained by integrating the acceleration crash pulse amplitude, e.g., the resulting amplitude from the acceleration amplitude in the vehicle's forward direction and the vehicle's right-side direction. The direction of impact may be obtained with the 2 argument arctangent function of the acceleration amplitude in the vehicle's forward direction and the vehicle's right-side direction. Vehicle crashes that involve multiple impacts may also be determined by the crash detection algorithm. For example, a crash pulse can be defined as being detected when acceleration amplitude is greater than a preset detection threshold for at least 30 milliseconds. Multiple crash/impacts can be defined as occurring when: more than one crash pulse is detected and these crash pulses are separated from each other by more than 300 milliseconds.

As shown in FIG. 7, the decision to place an emergency call in procedure 503 is based upon a rating of the emergency severity computed by emergency severity algorithm 701, or possibly, the motorcyclist's response to a "Do you want to place an emergency call?" question in a procedure 704. The computed emergency severity rating is first compared to a preset severity threshold in operation 702 and if the emergency severity rating is greater than the severity threshold, the decision/command to place an emergency call is immediately output from procedure 503 (to procedure 504 as discussed above in connection with FIG. 4). In the case that the emergency severity rating is greater than the severity threshold, the high the emergency severity rating indicates a high probability of serious injury and it is desirable to automatically initiate an emergency call without asking permission from the motorcyclist.

If the computed emergency severity rating is less than the severity threshold, process flow continues from procedure 702 to operation 703, wherein the emergency severity rating is compared to a preset likely severity threshold that is less than the severity threshold but greater than zero. If the computed emergency severity rating is equal to or greater than the likely severity threshold, process flow goes to a procedure 704 wherein the emergency processing module 112 asks the motorcyclist (or any other person in the vicinity of the helmet) for permission to make an emergency call. The desired value of the likely severity threshold is one that, in the case of minor crashes, such as backing into a wall at low speed, does not inconvenience the motorcyclist but does ask the motorcyclist (or any other person in the vicinity of the helmet) if an emergency call is desired for crashes that, although not severe, may possibly warrant an emergency call.

If the processing in procedure 704 determines that either the motorcyclist (or any other person in the vicinity of the helmet) indicates that an emergency call is desired or there is no response from the motorcyclist (or any other person in the vicinity of the helmet) within, e.g., 10 seconds, then process flow continues to a procedure 705 and the 'emergency call' decision/command is output from procedure 503. Conversely, if the computed emergency severity rating is less than the likely severity threshold in procedure 703 or if the processing in operation 704 determines that the motorcyclist (or any other person in the vicinity of the helmet) indicates that an emergency call is not desired, then process flow returns to procedure 501, which receives crash related telemetry and sensor data for continued emergency situation monitoring.

Note that there are various ways of implementing procedure 704. For example, the emergency processing module 112 may employ a system to generate a "Do you want to place an emergency call?" speech message through the audio front end and perform voice recognition on the motorcyclist's (or any other person's) verbal response. Alternatively, operation 704 may generate a "Press the emergency button for 3 seconds to place an emergency call" speech message and the motorcyclist (or any other person) presses button 119 to confirm. Also note that any reference to an algorithm described or depicted herein may be implemented in hardware, software run by one or more processors resident in emergency processing module 112 or a combination of both. Motorcycle helmets as described herein include all types of helmets that can be used in a similar way. Furthermore, the system and methods described above can be used with all types of active noise control systems.

The description of embodiments has been presented for purposes of illustration and description. Suitable modifications and variations to the embodiments may be performed in light of the above description. The described systems are exemplary in nature, and may include additional elements and/or omit elements. As used in this application, an element or procedure recited in the singular and proceeded with the word "a" or "an" should be understood as not excluding plural of said elements or procedures, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. It will be apparent to those of ordinary skill in the art that many more embodiments and implementations are possible. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. A helmet comprising:
    a rigid shell configured to spatially divide a shell interior from a shell ambience;
    an acoustic front-end comprising at least one loudspeaker disposed in the shell interior, at least one interior microphone configured to pick up sound in the shell interior when the helmet is worn by a user, and at least one exterior microphone, the at least one interior microphone having a sensitivity that is higher in the shell interior than in the shell ambience, and the at least one exterior microphone having a sensitivity that is higher in the shell ambience than in the shell interior when the helmet is worn by the user;
    a controllable transceiver operatively coupled to the acoustic front-end, the controllable transceiver being configured to establish a speech link with a counterpart transceiver via at least one wireless communication channel; and
    a controller configured to receive an emergency indication signal and to control the controllable transceiver to automatically establish via the at least one wireless communication channel the speech link between the acoustic front-end and the counterpart transceiver when the emergency indication signal is received.

2. The helmet of claim 1, further comprising an emergency state detector that is operatively coupled to the controller and configured to generate the emergency indication signal upon detection of an emergency state.

3. The helmet of claim 2, wherein the emergency state detector comprises, or is connected to, a crash sensor, an acceleration sensor, a speed sensor, a temperature sensor, an inclination sensor, and/or a global positioning sensor.

4. The helmet of claim 3, wherein the crash sensor, the acceleration sensor, the speed sensor, the temperature sensor, the inclination sensor, and/or the global positioning sensor is attached to the shell.

5. The helmet of claim 1, wherein the controllable transceiver is further configured to establish a data link with the counterpart transceiver via the at least one wireless communication channel when the emergency indication signal is received.

6. The helmet of claim 5, wherein the controller is configured to generate text messages to be transmitted via the data link.

7. The helmet of claim 6, wherein the text messages include global positioning data, inclination data, crash data, temperature data, and/or last maximum speed data before detecting an emergency.

8. The helmet of claim 1, wherein the controllable transceiver is further configured for near-field wireless communication and/or far-field wireless communication.

9. The helmet of claim 1, further comprising a data interface configured to provide a wired or wireless connection to a data interface of a vehicle.

10. The helmet of claim 1, further comprising a user interface configured to receive manual input from the user and to generate the emergency indication signal upon receipt of the manual input from the user.

11. The helmet of claim 1, further comprising an energy storage configured to supply electrical energy to the acoustic front-end, the controllable transceiver, and/or the controller.

12. An emergency call method for a helmet with a rigid shell that is configured to spatially divide a shell interior from a shell ambience, the emergency call method comprising:
    receiving an emergency indication signal;
    upon receipt of the emergency indication signal, establishing a speech link between a controllable transceiver and a counterpart transceiver via at least one wireless communication channel;
    reproducing sound in the shell interior and picking up sound with a sensitivity that is higher in the shell interior than in the shell ambience, wherein
    the sound reproduced in the shell is received from the counterpart transceiver and the sound picked-up in the shell interior is transmitted to the counterpart transceiver; and
    further picking up sound with a sensitivity that is higher in the shell ambience than in the shell interior, wherein the sound picked-up in the shell ambience is transmitted to the counterpart transceiver.

13. The emergency call method of claim 12, further comprising:
    detecting an emergency state and generating the emergency indication signal upon detection of the emergency state, or
    receiving manual input from a user and generating the emergency indication signal upon receipt of the manual input from the user.

14. The emergency call method of claim 13, wherein detecting the emergency state comprises crash sensing, acceleration sensing, speed sensing, temperature sensing, inclination sensing, and/or a global positioning sensing.

15. The emergency call method of claim 12, further comprising establishing a data link with the counterpart transceiver via the at least one wireless communication channel when the emergency indication signal is received.

16. The emergency call method of claim 15, further comprising generating text messages to be transmitted via the data link.

17. The emergency call method of claim 16, wherein the text messages include global positioning data, inclination data, crash data, temperature data, and/or last maximum speed data before detecting an emergency.

18. The emergency call method of claim 12, further comprising communicating via a wired connection or a wireless connection with a data interface of a vehicle, wherein communicating via the wireless connection includes performing near-field wireless communication and/or far-field wireless communication.

\* \* \* \* \*